United States Patent
Einav

(10) Patent No.: US 6,419,198 B1
(45) Date of Patent: Jul. 16, 2002

(54) CPU SUPPORTING ASSEMBLY

(75) Inventor: Yehuda Einav, Nes Ziona (IL)

(73) Assignee: Zag Industries Ltd., Rosh Ha'Ayin (IL)

( * ) Notice: Subject to any disclaimer, the term of this patent is extended or adjusted under 35 U.S.C. 154(b) by 0 days.

(21) Appl. No.: 09/635,683

(22) Filed: Aug. 10, 2000

Related U.S. Application Data

(60) Provisional application No. 60/164,958, filed on Nov. 12, 1999.

(51) Int. Cl.$^7$ .......................... A47B 91/00; A47G 29/00; B65D 19/00
(52) U.S. Cl. .......................... 248/346.07; 248/346.03; 248/346.3; 248/918; 248/678; 403/107
(58) Field of Search .................... 248/188.7, 188.6, 248/678, 346.03, 346.06, 346.07, 129, 131, 292.12, 346.3, 346.04, 310, 289.11, 291.1; 280/35, 79.11, 639, 659; 403/83, 84, 96, 105, 107

(56) References Cited

U.S. PATENT DOCUMENTS

| | | | | |
|---|---|---|---|---|
| 520,319 A | * | 5/1894 | Kynoch | 280/35 |
| 2,048,608 A | * | 7/1936 | Holland | 248/129 X |
| 2,534,367 A | | 12/1950 | Perrotta et al. | 280/35 |
| 3,923,318 A | * | 12/1975 | Renard | 280/35 |
| 4,449,969 A | * | 5/1984 | Schweizer | 248/528 |
| 4,743,039 A | * | 5/1988 | Ellis | 280/42 |
| 4,955,873 A | * | 9/1990 | Rajlevsky | 248/188.6 |
| 5,192,046 A | | 3/1993 | Howard | 248/676 |
| 5,295,648 A | | 3/1994 | Hames | 248/149 |
| 5,362,025 A | | 11/1994 | Trom et al. | 248/670 |
| 5,397,081 A | | 3/1995 | Landry et al. | 248/346 |
| D362,245 S | | 9/1995 | Moffatt | D14/114 |
| 5,511,758 A | | 4/1996 | Hsu | 248/461 |
| 5,660,451 A | | 8/1997 | Glynn | 312/223.2 |
| 5,887,837 A | | 3/1999 | Johns et al. | 248/371 |
| 6,059,384 A | | 5/2000 | Ho | 312/223.2 |

* cited by examiner

Primary Examiner—Leslie A. Braun
Assistant Examiner—Gwendolyn Baxter
(74) Attorney, Agent, or Firm—Pillsbury Winthrop LLP

(57) ABSTRACT

A CPU supporting assembly comprising a pair of interrelated supporting structures having upwardly facing supporting surfaces configured and positioned to support a CPU in downwardly engaged relation thereon. Two spaced pairs of generally oppositely facing confining surfaces facing toward one another are configured and positioned to confine a CPU therebetween. The supporting structures are constructed and arranged to move through a range of adjustable movements wherein a horizontal distance between the pairs of confining surfaces is adjustable to allow CPU's of various sizes to be supported by the assembly. The supporting structures further include a plurality of downwardly facing surfaces configured to position the supporting structures on a horizontally extending surface such as a floor.

19 Claims, 8 Drawing Sheets

CPU SUPPORTING ASSEMBLY

The present invention claims priority as a continuation-in-part to U.S. Provisional Patent Application of Einav, Ser. No. 60/164,958, filed Nov. 12, 1999, the entirety of which is hereby incorporated into the present application by reference.

FIELD OF THE INVENTION

This invention relates generally to CPU supporting assemblies and more particularly, to a CPU supporting assembly having pivotally interrelated supporting structures capable of a range of adjustable movement.

BACKGROUND OF THE INVENTION

Central Processing Units (CPU's) for computers are usually positioned on or near work surfaces to maintain a relatively close proximity to external computer-related devices such as monitors and keyboards. To save space, CPU's are regularly placed on their sides on the work surface or on the floor where they are prone to suffer damage caused by spills and dust. In addition, with the development of a greater variety of periphery devices, it has become necessary to move the CPU quite often in order to connect these additional external devices to connection ports, generally located at the rear of CPU's. Furthermore, CPU's are increasingly being manufactured that have a more space-saving upright tower design.

Previously, computer stands have been used to accommodate such CPU's (those either on their side or tower types) that have simply supplied an elevated support surface, such as in U.S. Pat. No. Des. 362,245. The elevated supporting arrangement of these stands avoided problems involving CPU's such as spills on the work surface and dust contamination at floor level. However, these stands do not provide any horizontal support to prevent the CPU from tipping over or sliding off the stand. U.S. Pat. No. 5,295,648 describes a computer system stand that provides vertical surfaces for horizontally supporting the CPU and is slidably adjustable to accommodate CPU's of various sizes. The range of adjustment of this design is quite limited, though. To provide support for a relatively thin CPU (such as one turned on its side) the extending legs must be made short to allow the base sections to be positioned closer to one another. However, this configuration will not allow sufficient expansion to support a wider CPU (such as a wide tower type) and one that has extending legs of sufficient length to accommodate wider CPU's will not properly support a thinner one, as the base sections will not move close enough together. Furthermore, this design does not provide mobility for the CPU (i.e., the CPU stand does not provide structure that enables it to move across a horizontal surface, such as a floor), therefore the CPU must be moved separately when access to the rear of the CPU is required or when relocation of the CPU is desired.

A CPU stand is needed that is mobile and provides horizontal support to a CPU with a greater range of adjustment.

SUMMARY OF THE INVENTION

The present invention can be embodied in an adjustable CPU supporting assembly comprising a pair of interrelated supporting structures having upwardly facing supporting surfaces configured and positioned to support a CPU in downwardly engaged relation thereon and two spaced pairs of generally oppositely facing confining surfaces facing toward one another configured and positioned to confine the CPU therebetween. The adjustable CPU supporting assembly also includes a pivotal connecting structure that is constructed and arranged to pivotally interconnect the supporting structures to one another for relative movement with respect to one another about a generally upright axis in opening and closing directions through a range of positions of adjustment, the supporting structures being constructed and arranged such that pivotal movement thereof through the range of positions of adjustment adjusts a horizontal distance between the pairs of confining surfaces to support CPU's of various sizes therebetween. A yieldable restraining mechanism is operatively connected between the supporting structures. The yieldable restraining mechanism provides locking structure constructed and arranged to operate when there is no CPU supported thereon (a) to releasably hold the supporting structures in locking engagement in a first position of adjustment, (b) to release the supporting structures from the locking engagement in response to manual force applied to the supporting structures for movement in the opening or closing directions thereof, and (c) to relock the supporting structures to releasably hold the supporting structures in a second position of adjustment when the manual force is removed. The supporting assembly also includes a plurality of downwardly facing surfaces configured with respect to the supporting structures to support the supporting structures on a horizontally extending surface.

Other aspects, features, and advantages of the present invention will become apparent from the following detailed description of the illustrated embodiment, the accompanying drawings, and the appended claims.

DETAILED DESCRIPTION OF THE PREFERRED EMBODIMENTS

Figure 1:
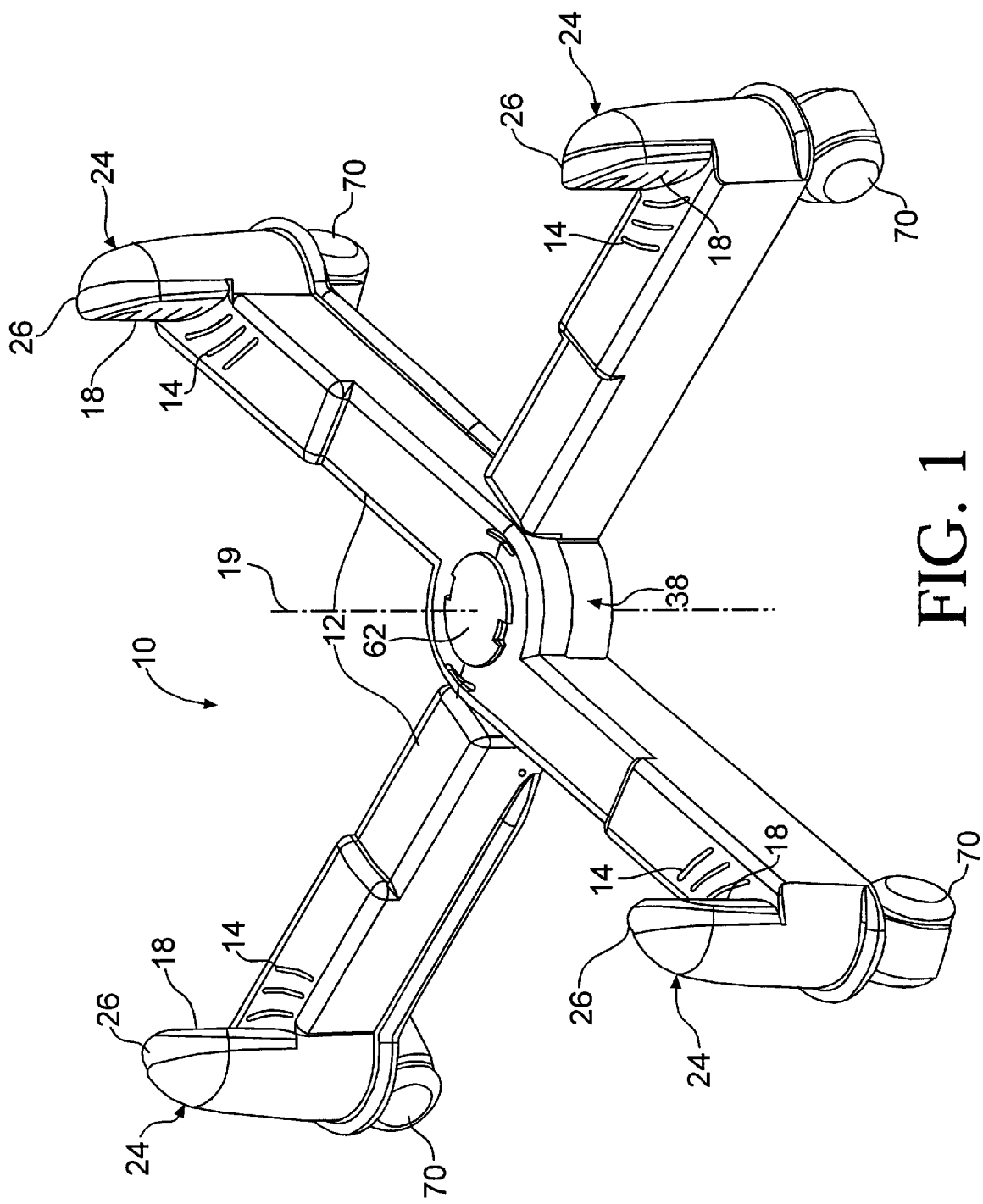
FIG. 1 is a perspective view of a CPU supporting assembly embodying the principles of the present invention.

FIG. 1 shows a CPU supporting assembly, generally indicated at 10, embodying the principles of the present invention. The assembly 10 comprises a pair of interrelated supporting structures 12 having upwardly facing supporting surfaces 14 configured and positioned to support a CPU, shown at 16 in FIG. 2, in downwardly engaged relation thereon. Two spaced pairs of generally oppositely facing confining surfaces 18 are configured and positioned facing toward one another to confine the CPU 16 therebetween. The supporting structures 12 are constructed and arranged to pivot with respect to one another about an upright axis 19 (FIG. 1) through a range of adjustable movement wherein a horizontal distance between the pairs of confining surfaces 18 is adjustable to allow CPU's of various sizes to be supported by the assembly 10. The supporting structures 12 further include a plurality of downwardly facing surfaces 20, shown in FIG. 2, configured with respect to the supporting structures to support the supporting structures 12 on a horizontally extending surface such as a floor.

Figure 4:
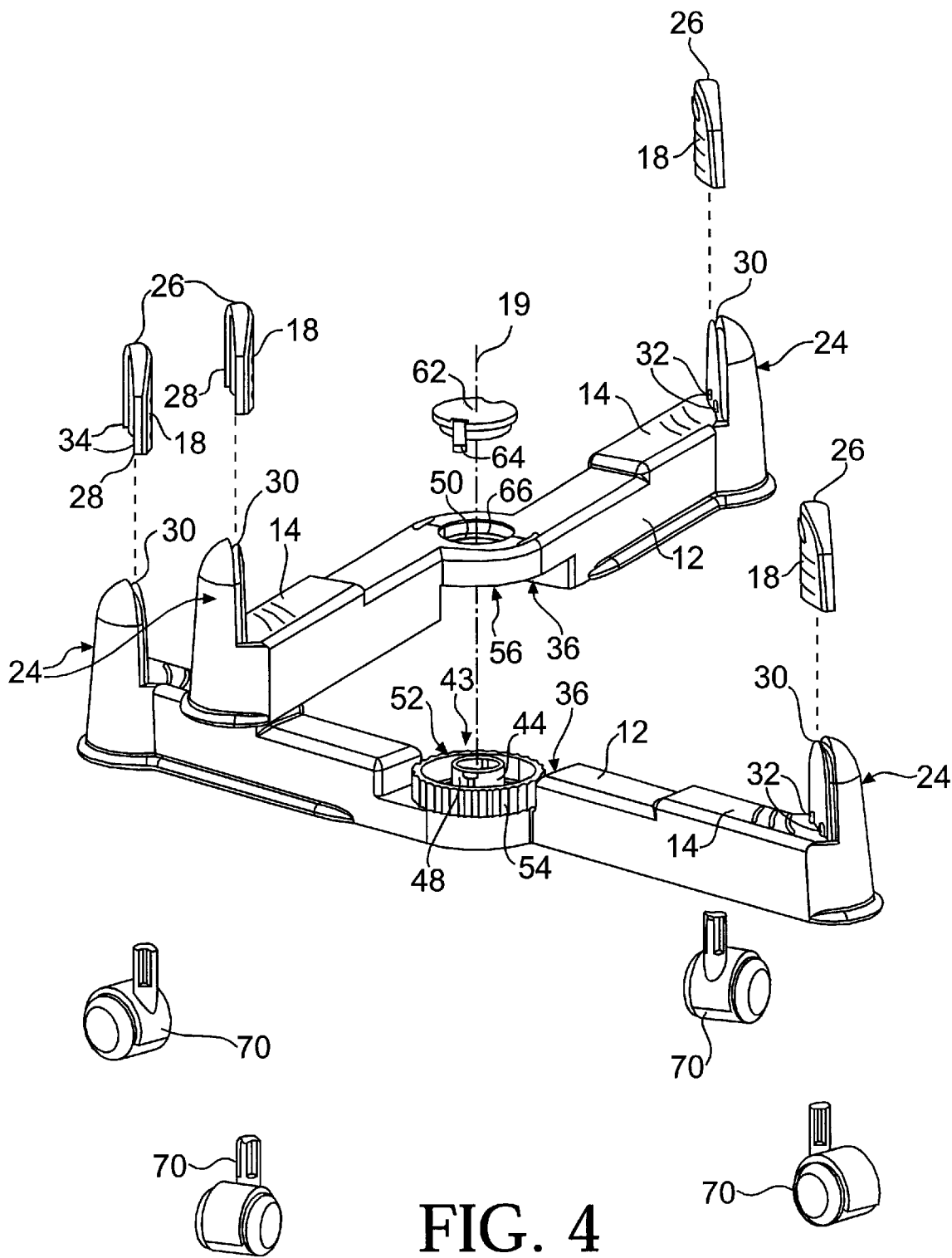
FIG. 4 is an exploded perspective view showing a pair of supporting structures, two pairs of CPU holding members, two pairs of caster wheels, and a center cap of the present invention prior to engagement.
Figure 5:
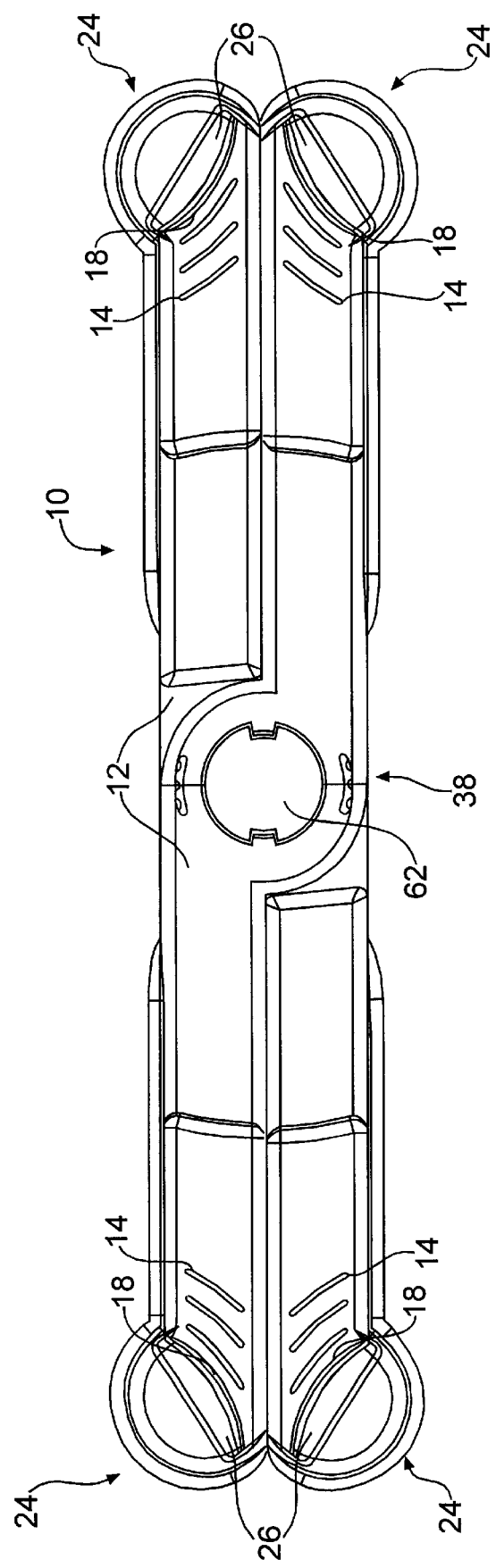
FIG. 5 is a perspective view showing a pair of supporting structures of the present invention in a fully closed position.
Figure 6:
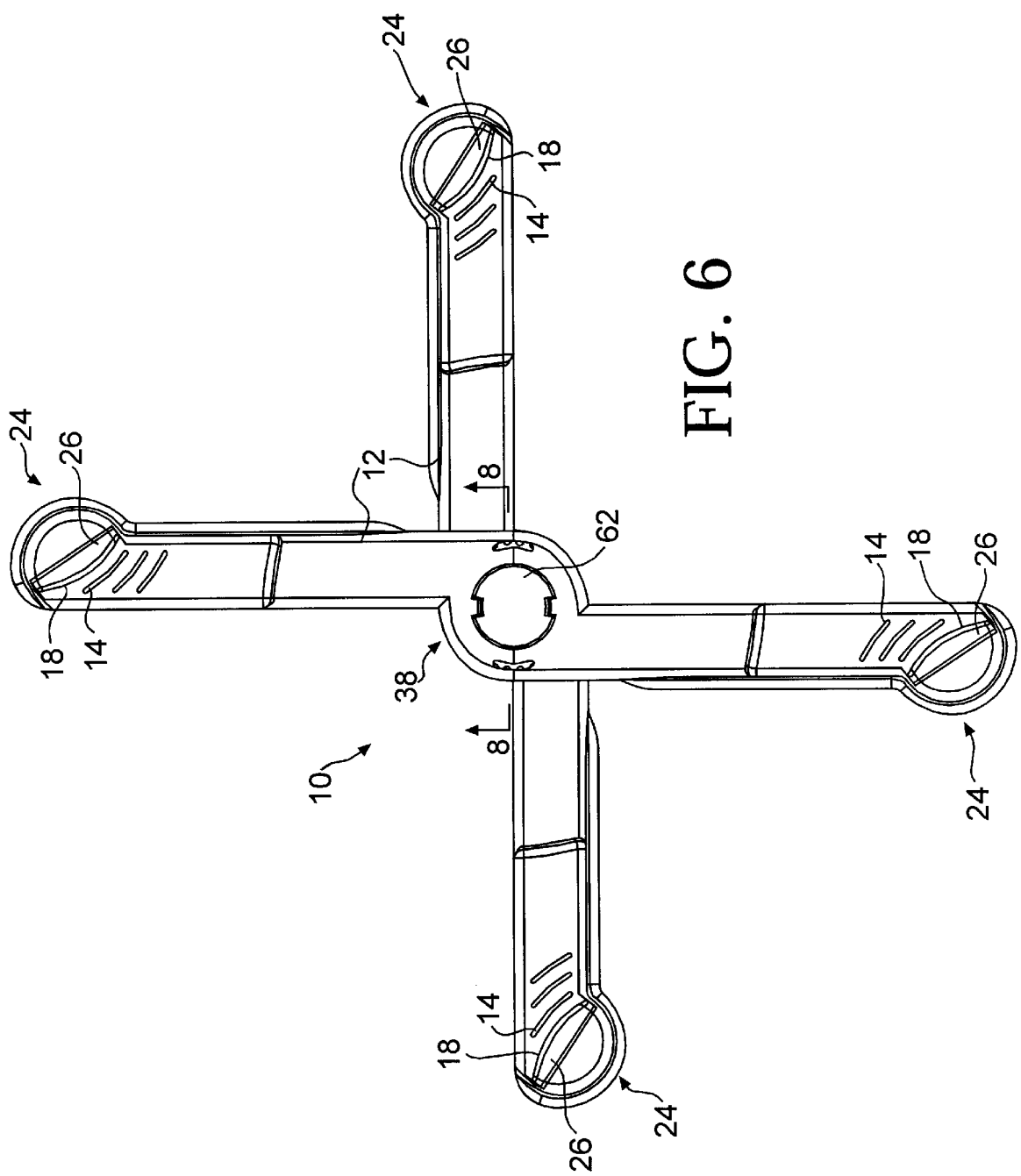
FIG. 6 is a perspective view showing a pair of supporting structures of the present invention in a fully open position.

The supporting structures 12 are formed from a molded plastic material, preferably polypropylene, and are of a generally elongated configuration having spaced ends on which a series of ribs are formed providing the upwardly facing supporting surfaces 14. The supporting structures 12 also include upstanding portions, generally indicated at 24, extending upwardly from the extremities of the ends, on which two pairs of CPU holding members 26, shown best in FIG. 4, are positively located. A series of ribs are formed on convexly arcuate surfaces of the CPU holding members 26 providing the two pairs of generally oppositely facing confining surfaces 18 that are configured and positioned facing toward one another to maintain a generally oppositely facing orientation for the full range of adjustable movement when there is no CPU supported thereon including a fully closed position, shown in FIG. 5, and a fully open position, shown in FIG. 6. The confining surfaces 18 engage associated sides of the CPU 16 and serve to add lateral confinement thereto. The CPU holding members 26 are preferably made of friction materials with a relatively higher coefficient of friction than the molded plastic material to aid in holding the CPU 16.

In positioning the CPU holding members 26 (FIG. 4) on the upstanding portions 24, a U-shaped flange 28 is slidably engaged with a corresponding U-shaped groove 30 in the upstanding portions. A pair of ramped protrusions 32 extending from the upstanding portions 24 engages a respective pair of locking tabs 34 extending from the CPU holding members 26. As the holding member 26 is pushed on, the locking tabs 34 slide along the ramped protrusions 32 causing the holding member 26 to flex outwardly from the U-shaped flange 28. Once the locking tabs 34 clear the ramped protrusions 32, the CPU holding members 26 resiliently flex back inwardly securing the locking tabs to a trailing surface of the ramped protrusions 32, thus positively locating the CPU holding members 26 on the upstanding portions 24.

Figure 7:
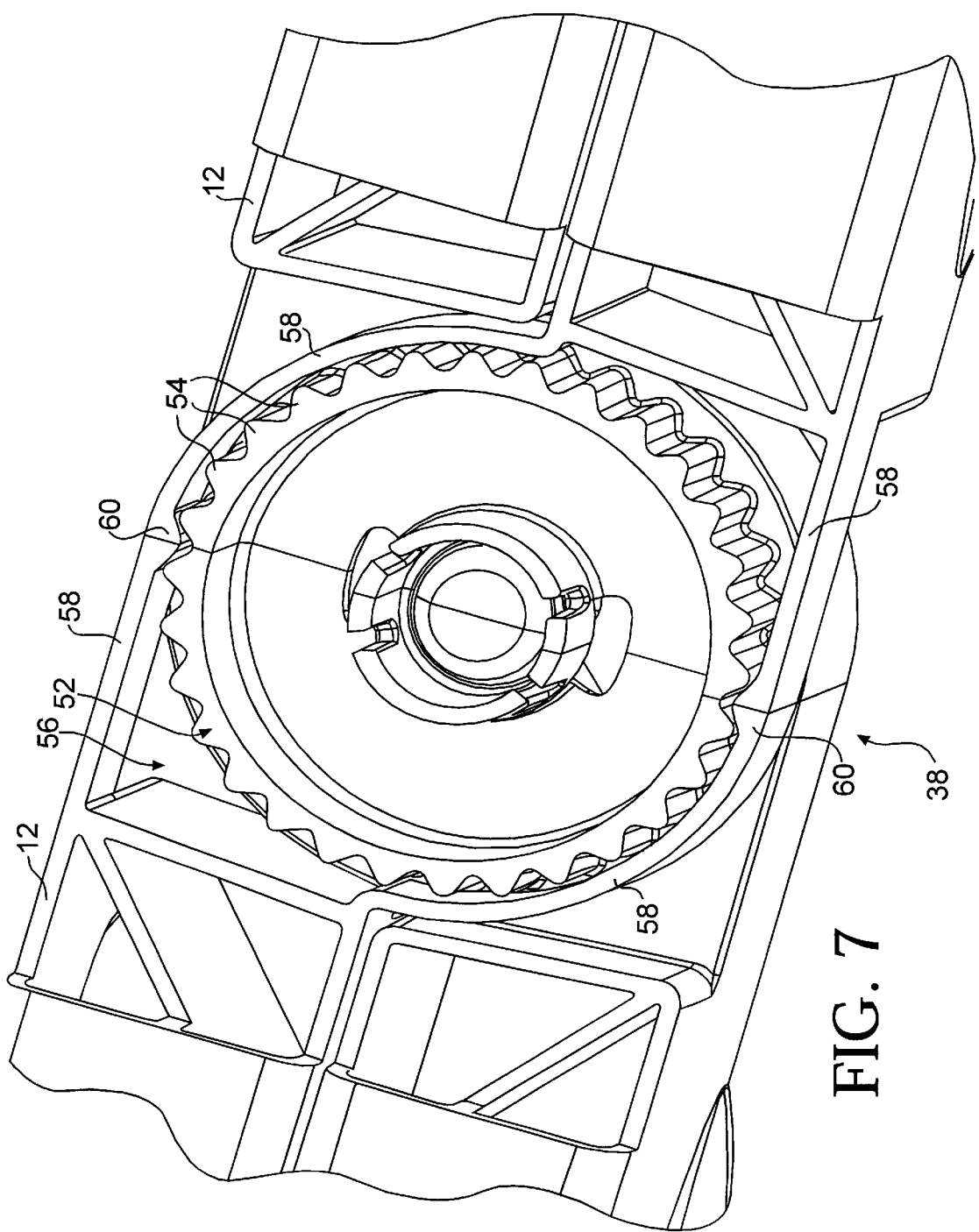
FIG. 7 is a perspective view of a partial cross-section of the supporting structures in a closed configuration to show the relationship of the teeth 54 to the tooth engaging elements 60.

Formed in central portions of the supporting structures 12 are oppositely formed recesses, generally indicated at 36 in FIG. 4, which allow the central portions to be interrelated by a pivotal connecting structure, generally indicated at 38 (FIG. 1), while maintaining the supporting surfaces 14 in a common plane. As shown in FIG. 7, the pivotal connecting structure 38 is constructed and arranged to interrelate the supporting structures 12 and includes a yieldable restraining mechanism.

Figure 8:
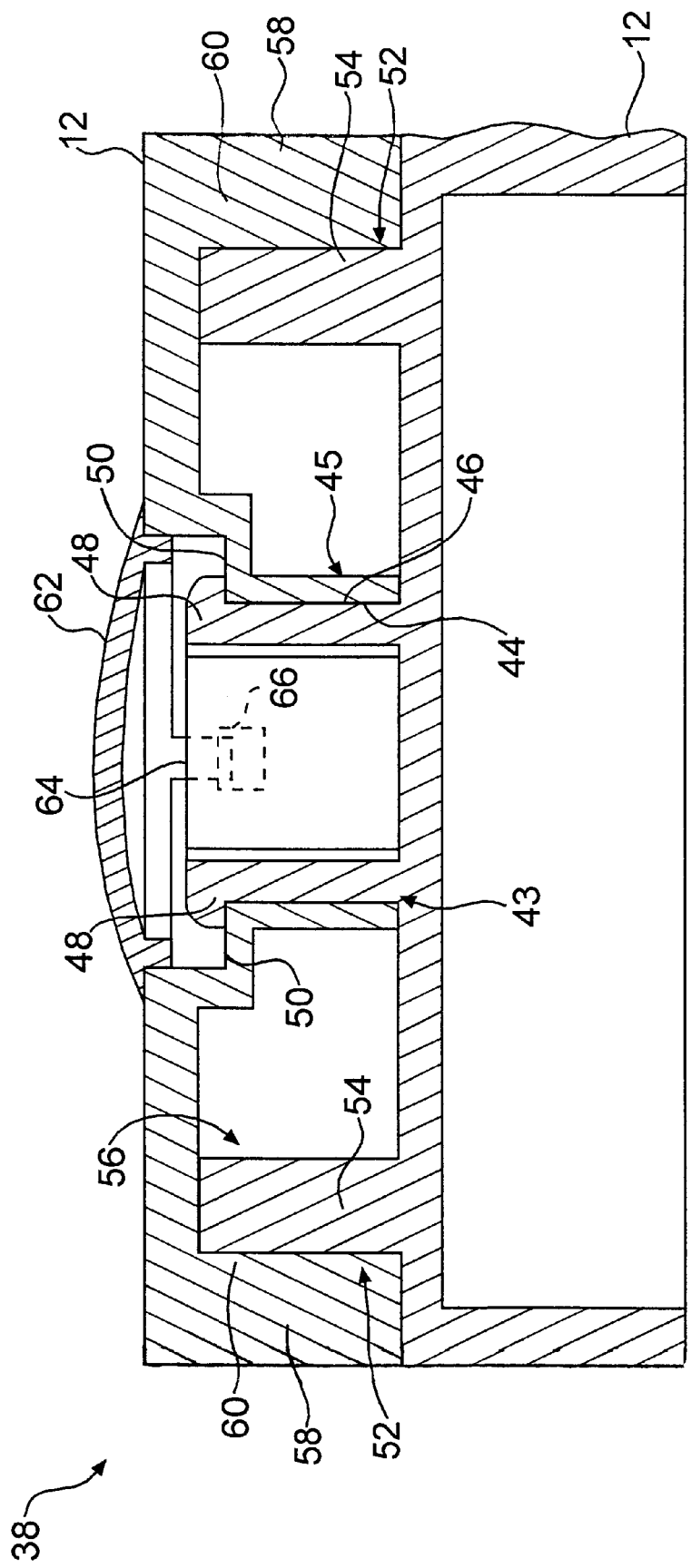
FIG. 8 is a cross-sectional view taken along line 8—8 of FIG. 6.

Shown in FIG. 8, the pivotal connecting structure comprises a lower support structure wherein a first axially extending circular protrusion, generally indicated at 43, provides an inner cylindrical surface 44. An upper support structure comprises a second axially extending circular protrusion, generally indicated at 45, which provides an outer cylindrical journaling surface 46. Effecting a relative axial movement between the pair of support structures 12 slidably engages the inner cylindrical surface 44 within the outer cylindrical surface 46 until an operative position is reached allowing the supporting structures to pivot with respect to one another. The first axially extending circular protrusion 43 comprises a pair of diametrically opposed ramped locking elements 48 constructed and arranged to deflect radially inwardly while passing within the second circular protrusion 45. The locking elements 48 then rebound radially outwardly to engage an axially outwardly facing shoulder 50 in the second circular protrusion 45 to thereby retain axial engagement between the support structures 12.

As shown in FIG. 7, the yieldable restraining mechanism comprises an axially extending annular toothed portion, generally indicated at 52 extending from a lower support structure 12. An outer surface of the annular toothed portion is defined by a plurality of annularly spaced, radially outwardly extending teeth 54. The annular toothed portion 52 extends within a downwardly facing portion-receiving recess, generally indicated at 56 in the upper support structure, shown in FIG. 8. The portion-receiving recess 56 comprises a plurality of side walls 58 defining an inner periphery including a pair of diametrically opposed radially inwardly extending tooth engaging elements 60 (FIG. 7). The side walls 58 are constructed and arranged to resiliently deflect radially outwardly.

An operative pivotal position of the support structures 12 is determined by the horizontal distance between facing confining surfaces 18 that is necessary to confine a CPU with a given width. In the operative position, each tooth engaging element 60 occupies an annular space between two adjacent teeth 54 (which particular teeth are involved corresponds to the particular position of the support structures 12) and engage adjacent surfaces of the same. Subsequent operative pivotal positions are similarly defined for the full range of adjustable movement.

Subsequent operative pivotal positions are obtained by effecting a relative pivotal movement between the support structures 12. During the pivotal movement of the support structures 12 from a first operative pivotal position to a second operative pivotal position, the teeth 54 are relatively moved past the tooth engaging elements 60. For each passing tooth, a first ramping action, produced by converging surfaces of the teeth 54 and tooth engaging elements 60, forces the side walls 58 to deflect radially outwardly. A second ramping action, caused by diverging surfaces of the teeth 54 and tooth engaging elements 60 allows the side walls 58 to resiliently rebound radially inwardly. The first and second ramping actions are repeated for each tooth passing the tooth engaging elements until the second operative pivotal position is reached.

Figure 3:
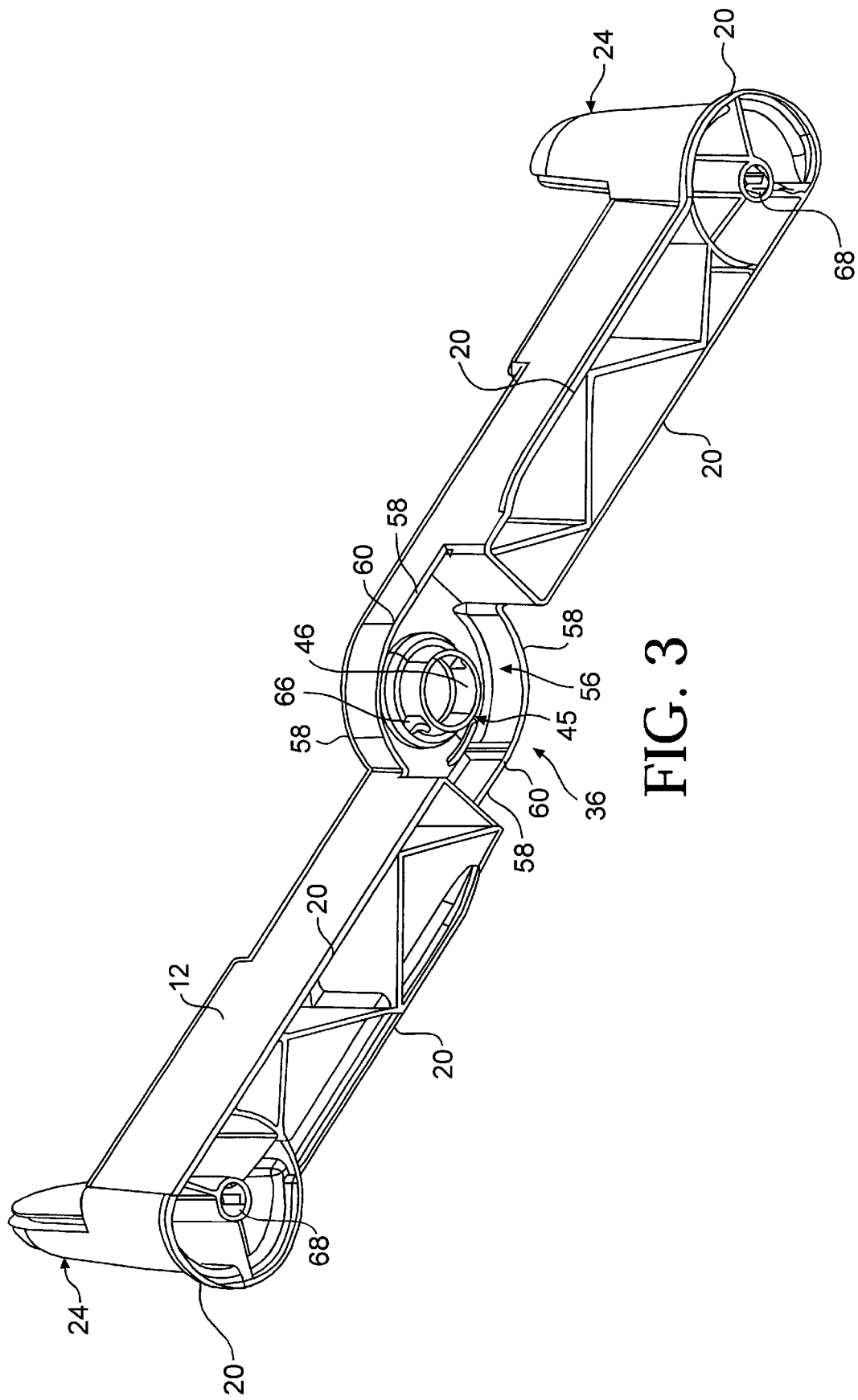
FIG. 3 is a perspective view showing the underside of a support structure of the present-invention.

A center cap 62 is constructed and arranged to be mounted in covering relation to an axially extending opening defined by the second axially extending circular protrusion 45. As shown in FIG. 4, a pair of diametrically opposed fastening tabs 64 extend downwardly from an outer periphery of the center cap 62. The fastening tabs 64 engage an associated pair of tab engaging recesses 66, shown in FIG. 3 extending radially outwardly through the second axially extending circular protrusion 45.

Figure 2:
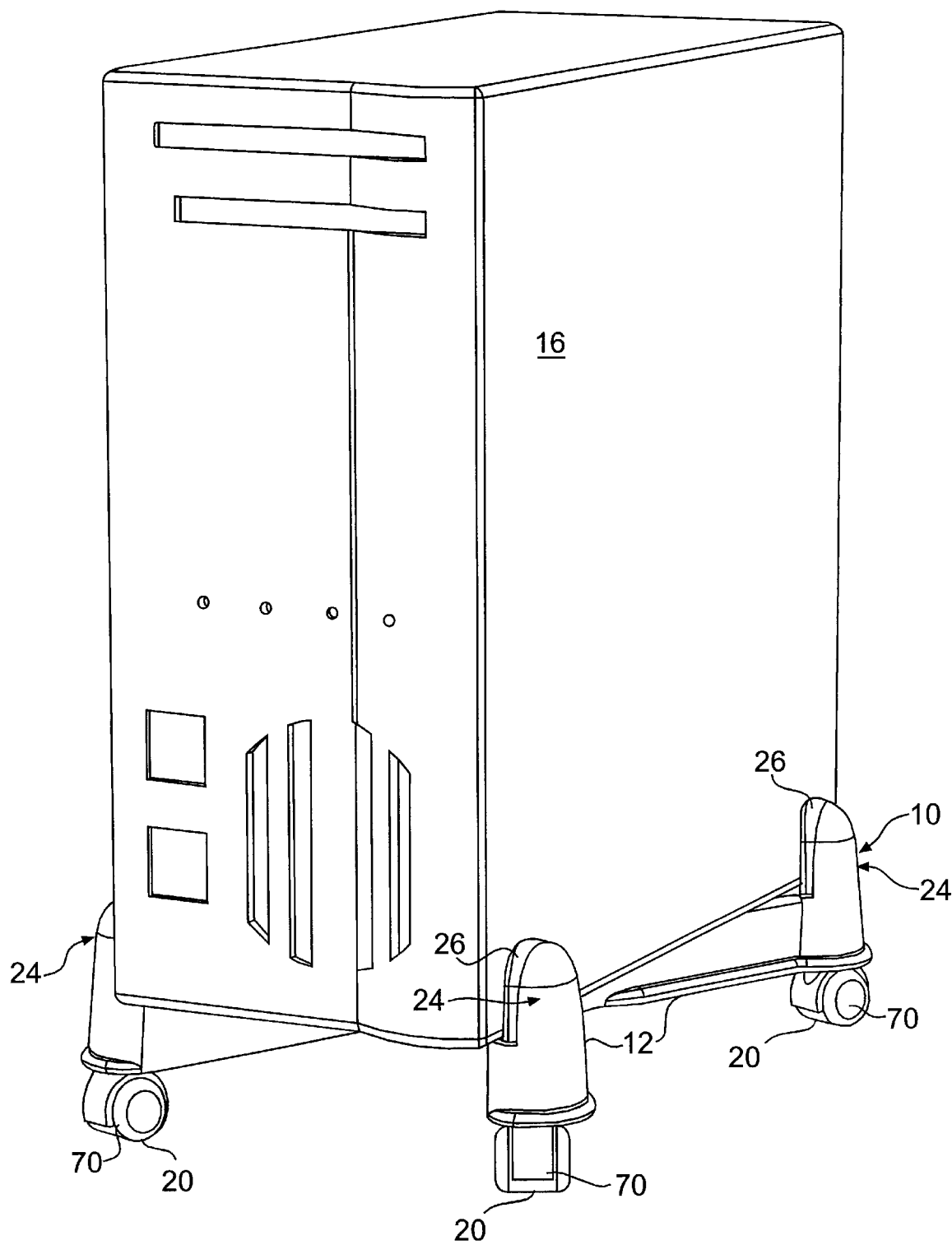
FIG. 2 is a perspective view showing a CPU in operative position with the CPU supporting assembly.

A plurality of downwardly opening recesses 68 allows a corresponding plurality of floor engaging caster wheels 70 to be mounted therein. The floor engaging caster wheels 70 may form the downwardly facing surfaces 20 thereon, as shown in FIG. 2, to provide mobility of the CPU supporting assembly. One of the downwardly opening recesses 68 and an associated caster wheel 70 may be positioned beneath each of the upstanding portions 24. It is contemplated that an additional downwardly opening recess (not shown) may be positioned at the center of the CPU supporting assembly, for example, within the pivotal connecting structure 38 to provide additional support for the CPU. It is also contemplated that the supporting structures 12 may provide the downwardly facing surfaces 20 on undersides thereof (FIG. 3), so that the CPU supporting assembly 10 may be positioned directly on a horizontal surface, such as a floor or desk.

While the principles of the present invention have been made clear in the illustrative embodiments set forth above, it will be obvious to those skilled in the art to make various modifications to the structure, arrangement, proportion, elements, materials, and components used in the practice of the invention.

Any U.S. Patent or patent applications mentioned herein above and not specifically incorporated by reference are hereby incorporated into the present application by reference.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed:

1. An adjustable CPU supporting assembly comprising:
   a pair of interrelated supporting structures having upwardly facing supporting surfaces configured and positioned to support a CPU in downwardly engaged relation thereon and two spaced pairs of generally oppositely facing confining surfaces facing toward one another configured and positioned to confine the CPU therebetween;
   pivotal connecting structure constructed and arranged to pivotally interconnect said supporting structures to one another for relative movement with respect to one another about a generally upright axis in opening and closing directions through a range of positions of adjustment, said supporting structures being constructed and arranged such that pivotal movement thereof through said range of positions of adjustment adjusts a horizontal distance between said pairs of confining surfaces to support CPU's of various sizes therebetween;
   a yieldable restraining mechanism operatively connected between said supporting structures, said yieldable restraining mechanism providing locking structure constructed and arranged to operate when there is no CPU supported on said supporting structures (a) to releasably hold said supporting structures in locking engagement in a first position of adjustment, (b) to release said supporting structures from said locking engagement in response to manual force applied to said supporting structures for movement in the opening or closing directions thereof, and (c) to relock said supporting structures to releasably hold said supporting structures in a second position of adjustment when said manual force is removed; and
   a plurality of downwardly facing surfaces configured with respect to said supporting structures to support said supporting structures on a horizontally extending surface.

2. An adjustable CPU supporting assembly as in claim 1, wherein
   said pivotal connecting structure comprises a first axially extending circular protrusion providing an inner cylindrical surface rotatably mounted within a second axially extending circular protrusion providing an outer cylindrical surface;
   said first axially extending circular protrusion comprising a pair of diametrically opposed ramped locking elements engaged with an axially outwardly facing shoulder in said second circular protrusion.

3. An adjustable CPU supporting assembly as in claim 2, wherein said pivotal connecting structure further includes a center cap constructed and arranged to be mounted in covering relation to an axially extending opening in said second axially extending circular protrusion, said center cap including a pair of diametrically opposed downwardly extending fastening tabs configured and positioned to engage an associated pair of radially outwardly extending tab-engaging recesses in said second axially extending circular protrusion.

4. An adjustable CPU supporting assembly as in claim 2, wherein
   said yieldable restraining mechanism comprises an annular toothed portion extending axially from a lower support structure;
   an outer surface of said annular toothed portion being defined by a plurality of annularly spaced, radially outwardly extending teeth;
   said annular toothed portion extending within a downwardly opening portion-receiving recess in an upper support structure comprising a plurality of side walls;
   said side walls being constructed and arranged to resiliently deflect radially outwardly and defining an inner periphery including a pair of diametrically opposed radially inwardly extending tooth engaging elements.

5. An adjustable CPU supporting assembly as in claim 4, wherein said side walls include said tooth engaging elements formed intermediate thereof and comprise a pair of wall ends at each end thereof;
   said wall ends being fixed to associated central portions.

6. An adjustable CPU supporting assembly as in claim 5, wherein an operative position of said support structures is defined by each tooth engaging element occupying an annular space between two adjacent teeth and engaging adjacent surfaces of the same.

7. An adjustable CPU supporting assembly as in claim 6, wherein an effected relative pivotal movement of said supporting structures forces said side walls to deflect radially outwardly resiliently biasing said relative movement in an opposite direction thereto.

8. An adjustable CPU supporting assembly as in claim 7, wherein said downwardly facing surfaces are provided by a plurality of caster wheels mounted in a plurality of downwardly opening recesses formed in said support structures.

9. An adjustable CPU supporting assembly as in claim 8, wherein said supporting structures are generally elongated members having a pair of spaced ends including a series of ribs thereon providing said supporting surfaces, and a pair of upstanding portions extending upwardly from extremities of said spaced ends, on which said confining surfaces are disposed.

10. An adjustable CPU supporting assembly as in claim 9, said confining surfaces being formed on a plurality of CPU holding members;
   each said CPU holding member being mounted on a respective one of said upstanding portions and each CPU holding member having a series of ribs providing said confining surfaces.

11. An adjustable CPU supporting assembly as in claim 10, wherein said supporting members are molded from a polypropylene material, and said CPU holding members are formed from a rubber thermoplastic material.

12. An adjustable CPU supporting assembly as in claim 1, wherein said downwardly facing surfaces are provided by a plurality of caster wheels mounted in a plurality of downwardly opening recesses formed in said support structures.

13. An adjustable CPU supporting assembly as in claim 1, wherein said supporting structures are generally elongated members having a pair of spaced ends including a series of ribs thereon providing said supporting surfaces, and a pair of upstanding portions extending upwardly from extremities of said spaced ends, on which said confining surfaces are disposed.

14. An adjustable CPU supporting assembly as in claim 13, said confining surfaces being formed on a plurality of CPU holding members;

said CPU holding members being constructed and arranged to slidably engage with said upstanding portions; and each CPU holding member comprising a series of ribs providing said confining surfaces.

15. An adjustable CPU supporting assembly as in claim 14, wherein said supporting members are molded from a polypropylene material, and said CPU holding members are formed from a rubber thermoplastic material.

16. An adjustable CPU supporting assembly as in claim 1, wherein said supporting members are molded from a polypropylene material.

17. An adjustable CPU supporting assembly as in claim 1, wherein said pivotal connecting structure is positioned on central portions of said supporting structures.

18. An adjustable CPU supporting assembly as in claim 1, wherein said supporting structures, said pivotal connecting structure and said yieldable restraining mechanism are each constructed of a respective molded plastic material.

19. An adjustable CPU supporting assembly as in claim 1, further comprising a CPU supported on said supporting structures, said supporting structures being positioned such that said generally oppositely facing confining surfaces engage associated sides of said CPU.

* * * * *